US012625567B2

(12) United States Patent
Kojima

(10) Patent No.: US 12,625,567 B2
(45) Date of Patent: May 12, 2026

(54) USER INTERFACE DEVICE, USER INTERFACE SYSTEM, AND RECORDING MEDIUM

(71) Applicant: Deep Insight Inc., Tokyo (JP)

(72) Inventor: Ryuichi Kojima, Tokyo (JP)

(73) Assignee: Deep Insight Inc., Tokyo (JP)

( * ) Notice: Subject to any disclaimer, the term of this patent is extended or adjusted under 35 U.S.C. 154(b) by 9 days.

(21) Appl. No.: 18/858,631

(22) PCT Filed: May 2, 2022

(86) PCT No.: PCT/JP2022/019519
§ 371 (c)(1),
(2) Date: Oct. 21, 2024

(87) PCT Pub. No.: WO2023/214451
PCT Pub. Date: Nov. 9, 2023

(65) Prior Publication Data
US 2025/0271948 A1 Aug. 28, 2025

(51) Int. Cl.
*G06F 3/0346* (2013.01)
*G06T 7/60* (2017.01)
*G06V 10/764* (2022.01)

(52) U.S. Cl.
CPC .............. *G06F 3/0346* (2013.01); *G06T 7/60* (2013.01); *G06V 10/764* (2022.01)

(58) Field of Classification Search
CPC ...... G06F 3/0346; G06F 3/017; G06F 3/0304; G06T 7/60; G06V 10/764; G06V 40/107; G06V 40/28
See application file for complete search history.

(56) References Cited

U.S. PATENT DOCUMENTS 8,472,665 B2 * 6/2013 Hildreth ................ G06F 3/0485
382/103
10,310,675 B2 * 6/2019 Oshima ................... G06F 3/017
(Continued)

FOREIGN PATENT DOCUMENTS

JP 2011-133942 A 7/2011
JP 2014-178887 A 9/2014
(Continued)

OTHER PUBLICATIONS

English Translation of International Search Report for PCT Application No. PCT/JP2022/019519 mailed Jul. 19, 2022.

*Primary Examiner* — Grant Sitta
(74) *Attorney, Agent, or Firm* — David A. Armstrong; Bret E. Field; Bozicevic, Field & Francis LLP

(57) ABSTRACT
A location of an indicator in a camera image and a shape of the indicator are accurately detected.
A user interface device configured to specify an indication by identifying a shape of an indicator based on a camera image obtained by capturing the indicator having the shape that changes for the indication includes a detector configured to search an image obtained by binarizing the camera image in at least two different diagonal directions to detect an end of an object included in the camera image, an image cropping unit configured to crop a partial image from the camera image based on the detected end, a selector configured to select a partial image indicating a shape before the indication and a partial image indicating a shape of the indication by the indicator when the partial image is a partial image obtained by capturing the indicator as the object, and an information generator configured to generate information indicating whether the indicator has the shape before the indication or the shape of the indication.

19 Claims, 18 Drawing Sheets

First search axis     Second search axis
$\theta_1$     $\theta_2$
First cropping rectangular region
Fingertip
Second cropping rectangular region
False detection
Binarized image including right hand

(56)                    References Cited

U.S. PATENT DOCUMENTS

| | | | | |
|---|---|---|---|---|
| 2005/0063564 A1* | 3/2005 | Yamamoto | ............. | G06V 40/28 |
| | | | | 701/1 |
| 2010/0194713 A1* | 8/2010 | Kawashima | ........ | G06F 3/04883 |
| | | | | 345/175 |
| 2015/0026646 A1* | 1/2015 | Ahn | ........................ | G06V 20/64 |
| | | | | 715/863 |
| 2015/0301633 A1 | 10/2015 | Nakamura | | |
| 2016/0165154 A1 | 6/2016 | Shinomiya | | |
| 2016/0231807 A1* | 8/2016 | Ogasawara | ............. | G06F 3/005 |
| 2017/0031452 A1 | 2/2017 | Isayama | | |
| 2019/0212814 A1 | 7/2019 | Akahori | | |
| 2020/0104629 A1 | 4/2020 | Hiroki | | |
| 2021/0271910 A1 | 9/2021 | Nakamura et al. | | |
| 2021/0397266 A1* | 12/2021 | Gupta | .................... | G06N 20/10 |

FOREIGN PATENT DOCUMENTS

| | | | |
|---|---|---|---|
| JP | 2015-69369 A | 4/2015 | |
| JP | 2016-167268 A | 9/2016 | |
| JP | 2019-121191 A | 7/2019 | |
| JP | 2020-57139 A | 4/2020 | |
| JP | 2021-133877 A | 9/2021 | |
| JP | 2022-78706 A | 5/2022 | |
| WO | WO2015104919 A1 | 7/2015 | |
| WO | WO2015108112 A1 | 7/2015 | |

* cited by examiner

Camera image including right hand

First search axis

Second search axis $\theta_1$ $\theta_2$

First cropping
rectangular region

Fingertip

Second cropping
rectangular region

False detection

Binarized image including right hand

Binarized image including left hand

FIG.7

| Class | Title | Image Example |
|---|---|---|
| 0 | Pointer : Non-Selected State | |
| 1 | Pointer : Selected State | |
| 2 | Non-Pointer  Part 1 | |
| 3 | Non-Pointer  Part 2 | |
| 4 | Non-Pointer  Part 3 | |
| 5 | Non-Pointer  Part 4 | |
| 6 | Non-Pointer  Part 5 | |
| 7 | Non-Pointer  Part 6 | |
| 8 | Non-Pointer  Part 7 | |
| 9 | Non-Pointer  Part 8 | |
| 1 0 | Non-Pointer  Part 9 | |
| 1 1 | Non-Pointer  Part 10 | |
| 1 2 | Part 11 (Other Than Finger) | |

USER INTERFACE DEVICE, USER INTERFACE SYSTEM, AND RECORDING MEDIUM

CROSS-REFERENCE TO RELATED APPLICATIONS

This application is the national phase under 35 U.S.C. § 371 of PCT International Application No. PCT/JP2022/019519 which has an International filing date of May 2, 2022 and designated the United States of America.

BACKGROUND ART

A user interface device that performs input to a computer by movement of a fingertip of a user is described in, for example, Japanese Patent Laid-Open Publication No. 2011-133942.

Japanese Patent Laid-Open Publication No. 2011-133942 describes a user interface device that can change a screen displayed on a touch panel in response to movement of a fingertip of a user even when the fingertip is not touching the touch panel. Specifically, Japanese Patent Laid-Open Publication No. 2011-133942 describes that a user interface device includes an image output means capable of outputting a display image to be displayed on a display, an imaging means for capturing a peripheral image of the periphery of the display, an analysis means for analyzing a state of a finger of the user based on the captured peripheral image, an estimation means for estimating operation intention of the user based on the analyzed state of the finger, and a control means for controlling the image output means to change the display image according to the estimated operation intention before a fingertip of the user touches a surface of the display.

SUMMARY

In a user interface device that exchanges information with another device based on movement of an indicator, such as a finger, recognized from a camera image, it is necessary to accurately detect a location of the indicator in the camera image and a shape of the indicator.

An object of the disclosure is to provide a user interface device, a user interface system, and a recording medium capable of accurately detecting a location of an indicator in a camera image and a shape of the indicator.

(1) A first aspect of the disclosure is a user interface device configured to specify an indication by identifying a shape of an indicator based on a camera image obtained by capturing the indicator having the shape that changes for the indication, the user interface device including a detector configured to search an image obtained by binarizing the camera image in at least two different diagonal directions to detect an end of an object included in the camera image, an image cropping unit configured to crop a partial image from the camera image based on the detected end, a selector configured to select a partial image indicating a shape before the indication and a partial image indicating a shape of the indication by the indicator when the partial image is a partial image obtained by capturing the indicator as the object, and an information generator configured to generate information indicating whether the indicator has the shape before the indication or the shape of the indication.

(2) A second aspect of the disclosure is a user interface system including the user interface device of (1), an imaging device configured to capture an indicator having a shape that changes for an indication, and a display device configured to display a display screen operated based on information indicating whether the indicator output from the user interface device has a shape before the indication or a shape of the indication.

(3) A third aspect of the disclosure is a computer readable non-transitory recording medium recording a user interface program configured to cause a computer to execute a detection function of performing a search in at least two different diagonal directions to detect an end of an object included in a camera image, an image cropping function of cropping a partial image from the camera image based on the detected end, a selection function of selecting a partial image indicating a shape before an indication and a partial image indicating a shape of the indication by an indicator when the partial image is a partial image obtained by capturing the indicator having a shape that changes for the indication as the object, and an information generation function of generating information indicating whether the indicator has the shape before the indication or the shape of the indication.

According to the disclosure, it is possible to accurately detect a location of an indicator in a camera image and a shape of the indicator.

The above and further objects and features of the invention will more fully be apparent from the following detailed description with accompanying drawings.

BRIEF DESCRIPTION OF DRAWINGS

FIG. 3 is a block diagram illustrating a configuration of a user interface device.

FIG. 7 is a diagram illustrating a table in which partial images are classified.

DESCRIPTION

Hereinafter, embodiments of the present disclosure will be described in detail with reference to the drawings.

Embodiment 1

Figure 1:
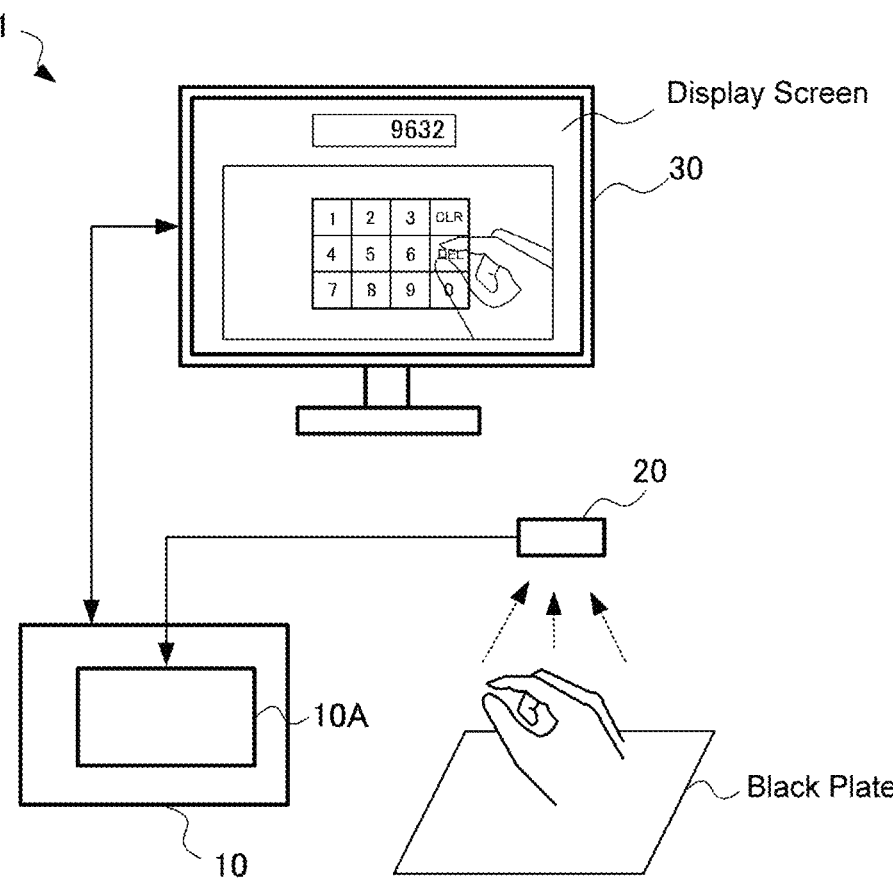
FIG. 1 is a block diagram illustrating a user interface system of an embodiment of the disclosure.
Figure 2:
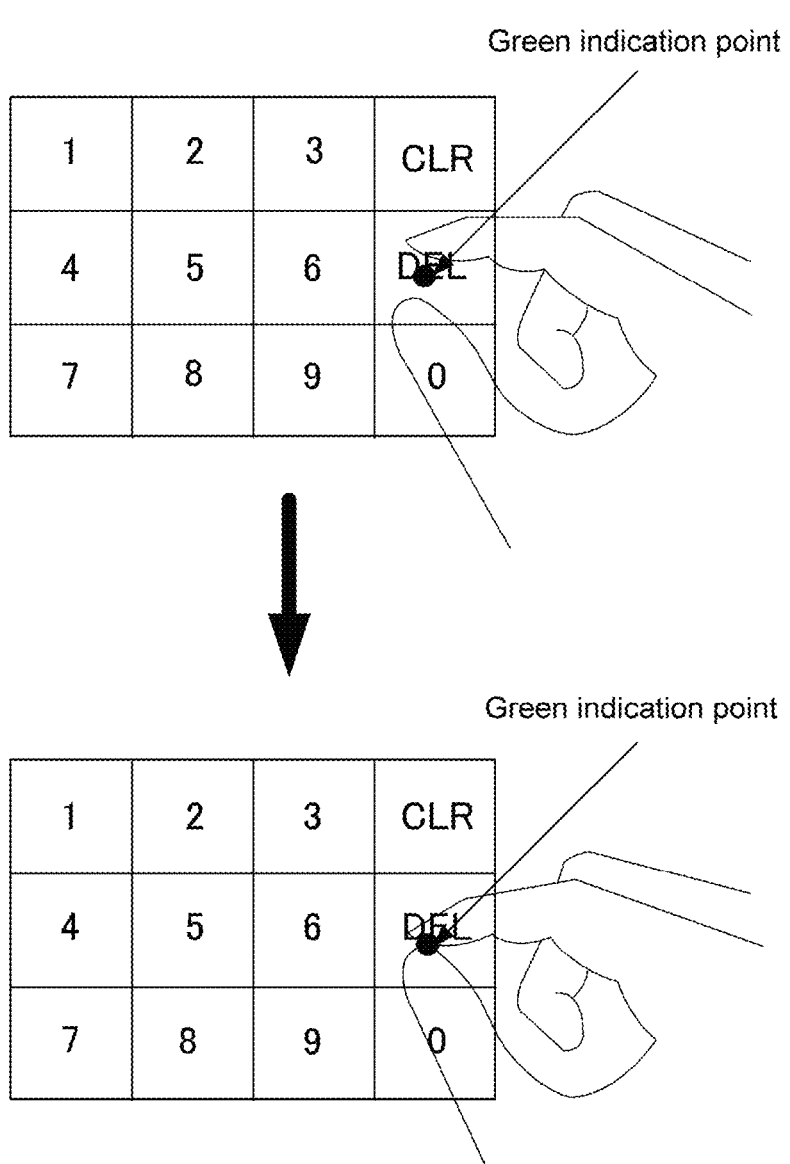
FIG. 2 is an explanatory diagram illustrating an action of selecting a numeric key by pinching using a thumb and an index finger.
Figure 3:
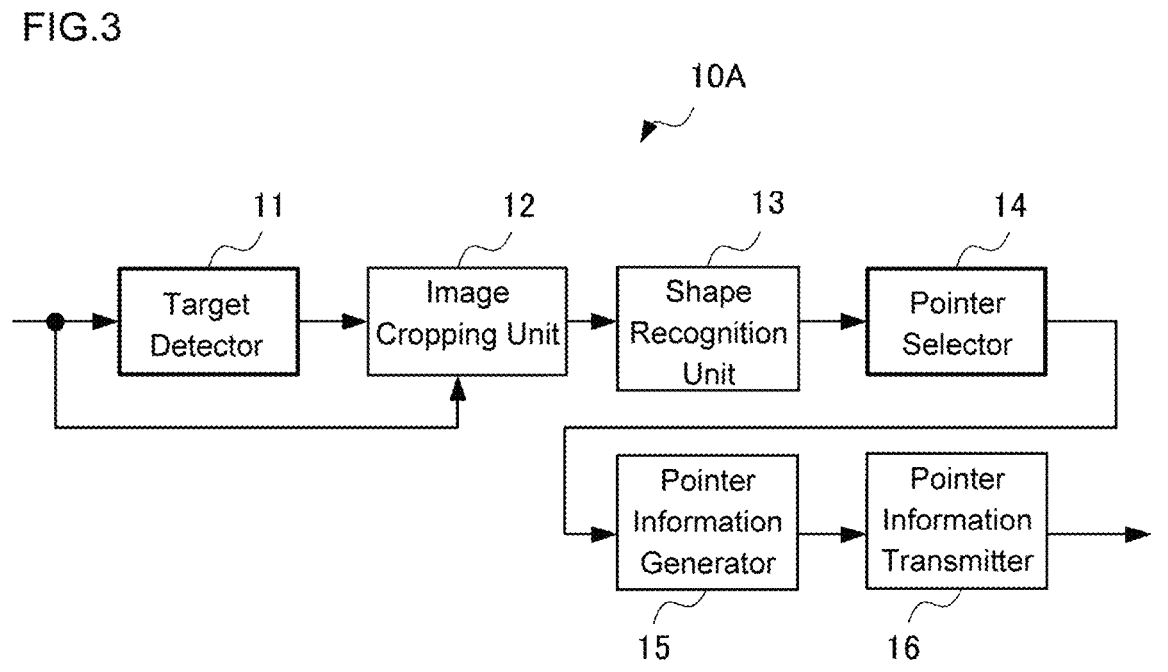
Figure 4:
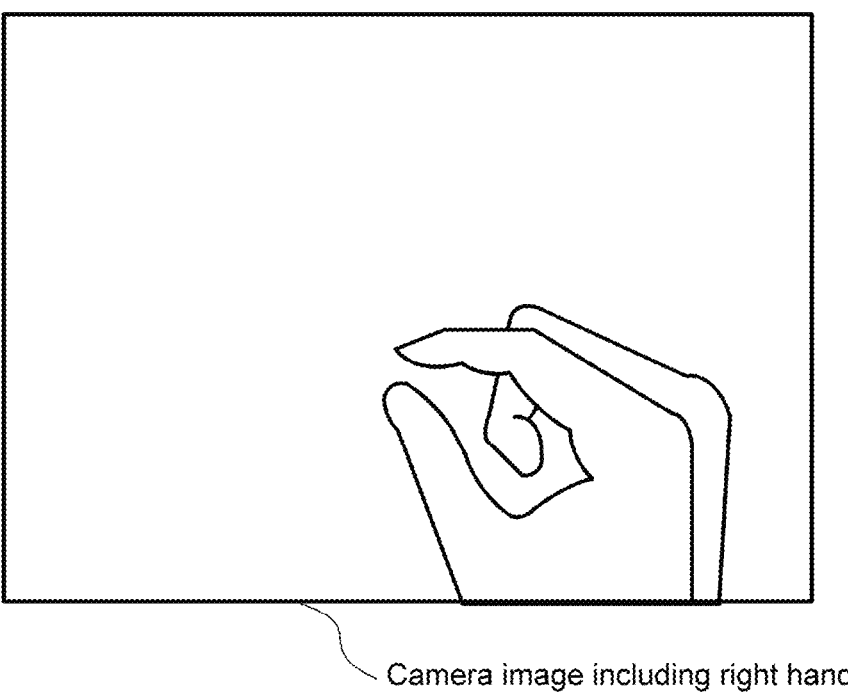
FIG. 4 is a diagram illustrating a camera image including a right hand.
Figure 5:
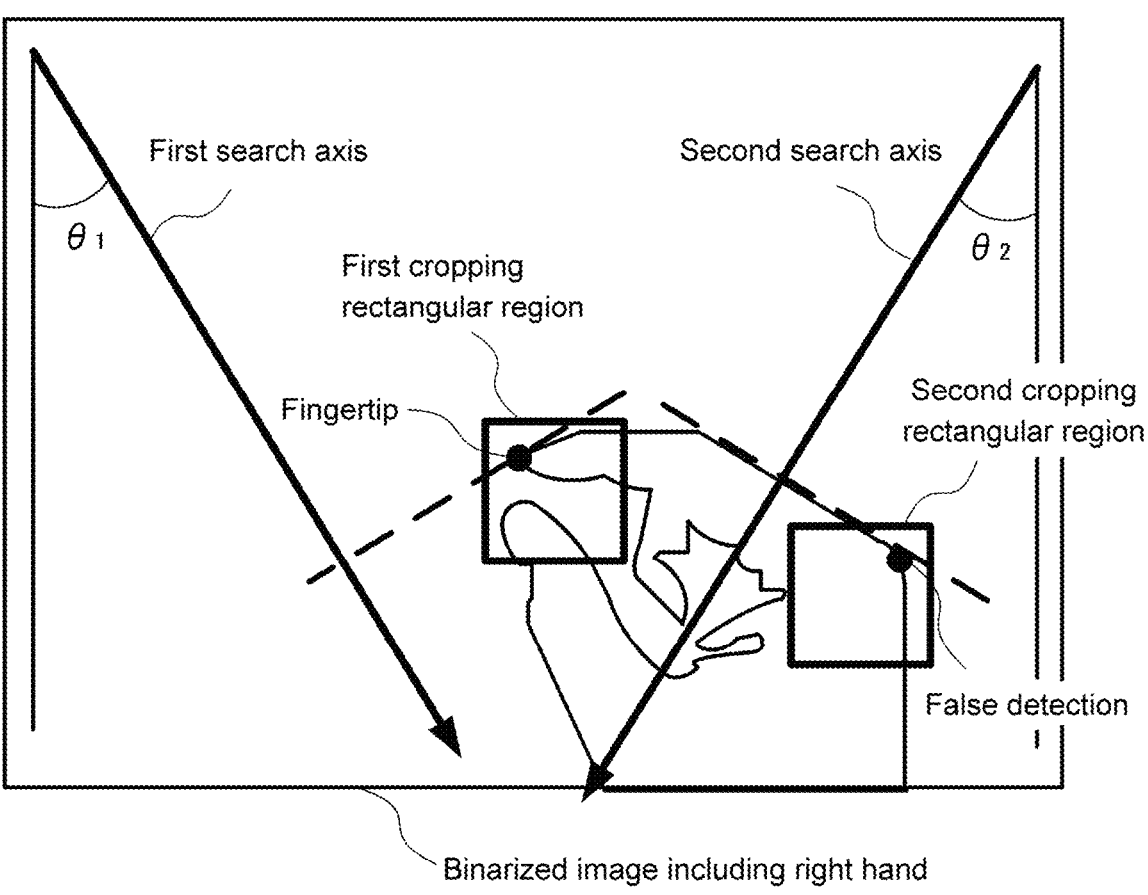
FIG. 5 is a diagram describing a method of searching for a fingertip on an image obtained by extracting a shape of the right hand.
Figure 6:
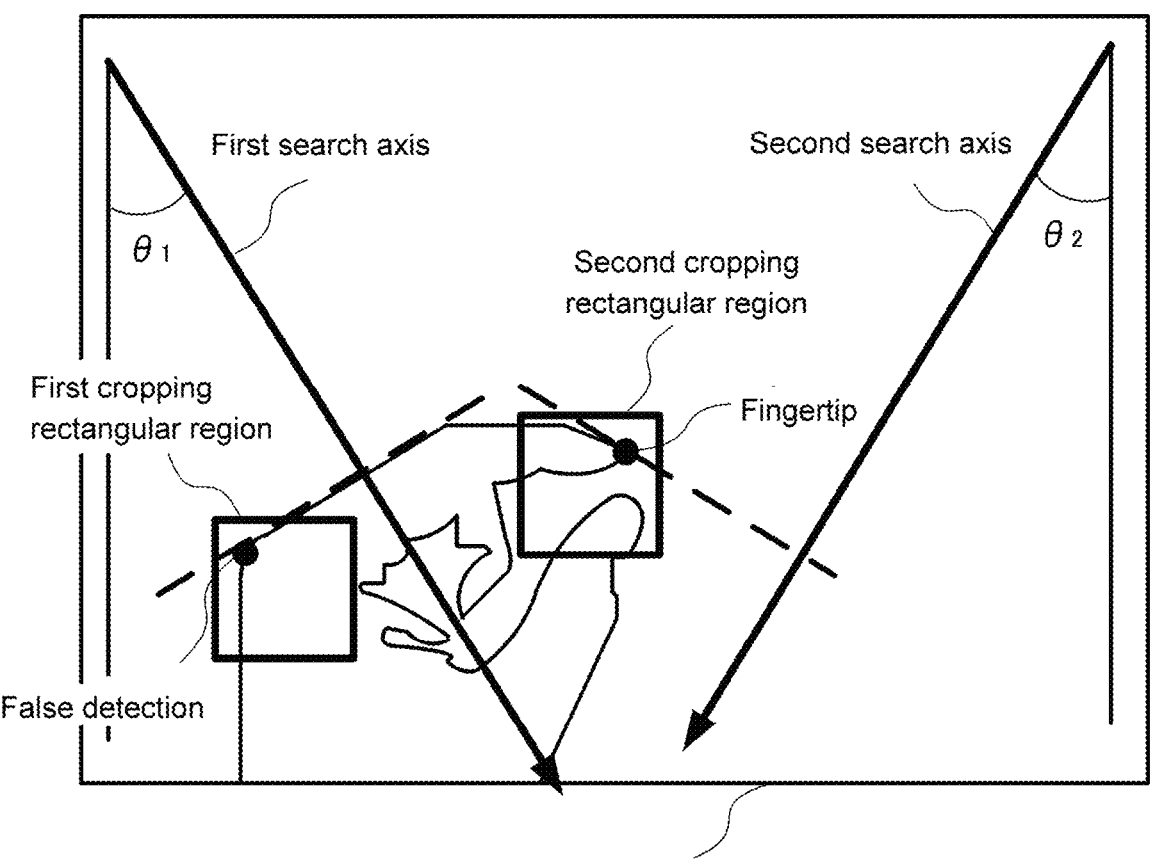
FIG. 6 is a diagram describing a method of searching for a fingertip on an image obtained by extracting a shape of a left hand.

FIG. 1 is a block diagram illustrating a user interface system of an embodiment of the disclosure. FIG. 2 is an explanatory diagram illustrating an action of selecting a numeric key by pinching using a thumb and an index finger. FIG. 3 is a block diagram illustrating a configuration of a user interface device. FIG. 4 is a diagram illustrating a camera image including a right hand. FIG. 5 is a diagram describing a method of searching for a fingertip on an image obtained by extracting a shape of the right hand. FIG. 6 is a diagram describing a method of searching for a fingertip on an image obtained by extracting a shape of a left hand.

As illustrated in FIG. 1, a user interface system 1 includes a personal computer 10 having a user interface device 10A, a camera 20 serving as an imaging device, and a display device 30 such as a liquid crystal display device. Here, a description is given of an example in which a part of the personal computer 10 is included as a part of the user interface device 10A. However, the user interface device 10A may be provided separately from the personal computer 10.

The personal computer 10 can read the recording medium 40 on which the user interface program is recorded by a recording medium reading section (not shown).

The user interface system 1 illustrated in FIG. 1 captures a hand of a user, including a thumb and an index finger serving as indicators, on a black plate using the camera 20, and the personal computer 10 displays the thumb and the index finger semi-transparently on a numeric keypad (keys for inputting numbers) on a display screen of the display device 30.

When the user pinches the thumb and the index finger on a numeric key desired to be input by the user, the personal computer 10 determines that the numeric key has been selected by pinching using the thumb and the index finger, and displays a number in a numeric input field on the display screen of the display device 30. As illustrated in FIG. 1, a numeric keypad has, in addition to numeric keys 0 to 9, a delete key indicated by "DEL" and a clear key indicated by "CLR". As illustrated in FIG. 2, when an indication point (for example, a green indication point) is displayed between the thumb and the index finger, this indication point is placed on a key to be selected, here, the delete key, and the thumb and the index finger are pinched, the delete key is selected and "2" of a number "9632" in the numeric input field can be deleted. By providing the pointer position between the thumb and the index finger, selection becomes easy even when the key is small. However, the indication point does not have to be displayed.

An action of pinching by fingertips using the thumb and the index finger is a familiar action for anyone and is a suitable action for selection operation, and thus in this embodiment, the action of pinching by fingertips using the thumb and the index finger is used as a selection action. The thumb and the index finger are indicators. However, in the following description, the thumb and the index finger are described as pointers that specify a position on a key.

FIG. 2 illustrates an example in which numbers are displayed in the numeric input field on the display screen of display device 30 by pinching using the thumb and the index finger using a right hand. However, numbers may also be displayed in the numeric input field on the display screen of display device 30 by pinching using the thumb and the index finger using a left hand.

As illustrated in FIG. 3, the user interface device 10A includes a target detector 11, an image cropping unit 12, a shape recognition unit 13, a pointer selector 14, a pointer information generator 15, and a pointer information transmitter 16.

The target detector 11 binarizes the camera image, detects a target part (for example, the thumb and the index finger), and outputs a position of a fingertip on the image and a size of a region including the fingertip.

A camera image captured by the camera 20 is input to the target detector 11. FIG. 4 is a diagram illustrating a camera image including the right hand. Although not illustrated in FIG. 4, a part other than the right hand has a background color (here, the black color of the black plate).

The target detector 11 performs a search on two axes in two different diagonal directions to detect a fingertip on an image obtained by binarizing a camera image and extracting a shape of a hand. By performing a search using the two axes, a search is performed by scanning the right hand in a lower right direction and scanning the left hand in a lower left direction, and a first intersecting point can be regarded as a fingertip.

FIG. 5 is a diagram describing a method of searching for a fingertip on an image obtained by extracting a shape of the right hand. FIG. 6 is a diagram describing a method of searching for a fingertip on an image obtained by extracting a shape of a left hand.

As illustrated in FIG. 5, when a binarized image of the right hand is searched using a first search axis, a fingertip can be extracted, and as illustrated in FIG. 6, when a binarized image of the left hand is searched using a second search axis, a fingertip can be extracted. By performing a search using the two axes in this manner, it is possible to detect the fingertips of both the right and left hands (the detected positions of the fingertips are indicated by black dots in FIGS. 5 and 6).

As illustrated in FIGS. 5 and 6, when the image of the right hand or the left hand is searched using the first search axis and the second search axis, a fingertip can be extracted using one search axis, whereas a part that is not a fingertip (detected position is indicated by a black dot) is extracted (erroneously detected) on the other search axis side. However, the part other than the fingertip can be excluded by a pointer selector 14 at a subsequent stage using recognition information.

To search for the fingertip, it is preferable to set a search direction to a direction of about 30° from a downward direction (angles $\theta 1$ and $\theta 2$ of FIGS. 5 and 6 are set to about 30°).

The target detector 11 outputs a detected position of a fingertip on each of two images obtained by searching using the two axes, the first search axis and the second search axis, and a size of a region including the fingertip. The size is set to a specified value, and specifies a region to be cropped by the image cropping unit 12. A first cropped rectangular region and a second cropped rectangular region illustrated in FIG. 5 and FIG. 6 correspond to a region to be cropped by the image cropping unit 12.

Note that, even though the search axis is set to two axes in two diagonal directions, three or more axes may be used.

The image cropping unit 12 crops, from a camera image output from the camera 20, a partial image corresponding to a detected position of a fingertip detected by a search of the first search axis and the second search axis and a size of a region including the fingertip output from the target detector 11. Two cropped partial images correspond to the first cropped rectangular region and the second cropped rectangular region of FIG. 5 or FIG. 6.

Note that a similar effect can be obtained by extracting a partial image from the binarized image instead of the camera image.

The shape recognition unit 13 performs inference on the partial images cropped by the image cropping unit 12 using deep learning, classifies shapes, and outputs positions and shapes of the partial images.

The image captured by the camera 20 includes various images in addition to the image obtained by capturing the hand of the user including the thumb and the index finger illustrated in FIG. 2. Therefore, the partial images also include various images in addition to the image of the thumb and the index finger. The shape recognition unit 13 assigns class numbers from 0 to 12 to thirteen shapes illustrated in the table in FIG. 7 and classifies the partial images by deep learning.

As illustrated in FIG. 7, in class 0, the thumb and the index finger are separated from each other, and the pointer is in a non-selected state. In class 1, the thumb and the index finger are in contact, and the pointer is in a selected state. The thumb and the index finger serve as indicators, the non-selected state is a shape before an indication, and selected state is a shape of the indication.

Classes 2 and 3 are each in a state of not being a pointer (non-pointer) with one finger of the thumb or the index finger. Classes 4 and 5 are each in a state of not being a pointer (non-pointer) with two fingers of the index finger and a middle finger. However, class 4 is in a state having a gap, and class 5 is in a state not having a gap. Classes 6 and 7 are each in a state of not being a pointer (non-pointer) with three fingers of the index finger, the middle finger, and a ring finger. However, class 6 is in a state having a gap, and class 7 is in a state not having a gap. Class 8 is in a state of not being a pointer (non-pointer) with four fingers of the index finger, the middle finger, the ring finger, and a little finger. In class 9, an angle is from a side of a base of a finger, which is in a state of not being a pointer (non-pointer). Class 10 is in a clenched fist state, and is in a state of not being a pointer (non-pointer). Class 11 indicates a shape of a finger other than classes 0 to 10, and is in a state of not being a pointer (non-pointer). Class 12 indicates a shape other than a finger, and is in a state of not being a pointer (non-pointer).

Note that, even though each of classes 0 and 1 indicates a partial image of the thumb and the index finger of the right hand in FIG. 7, a partial image of the thumb and the index finger of the left hand can be similarly classified.

The pointer selector 14 extracts only a partial image having a shape corresponding to a pointer shape from partial images, and outputs a position and the shape of the partial image of the pointer. In this embodiment, only class 0 and class 1 are used as pointers, and other shapes that appear in the image are ignored and not extracted. By this selection operation, it is possible to exclude a part that is not a finger detected by a search using two axes of the first search axis and the second search axis. When a plurality of candidates remains, one located at a top of a camera image is selected. A reason therefor is that, when a person stands in front of the camera and extends a fingertip, the fingertip tends to appear higher than any other component of a hand.

The pointer information generator 15 generates information indicating whether the pointer is in the selected state or the non-selected state (information indicating the state of the pointer) depending on whether the partial image extracted by the pointer selector 14 is class 0 or class 1, and outputs information indicating the position of the partial image of the pointer and the state of the pointer. A position of the indication point (for example, the green indication point) between the thumb and the index finger illustrated in FIG. 2 is determined by the pointer information generator 15.

The pointer information transmitter 16 outputs information indicating the position of the partial image and the state of the pointer to a calling application included in the personal computer 10 or to a host device outside the user interface device 10A.

The functional blocks included in the user interface device 10A have been described above.

To realize these functional blocks, the user interface device 10A or the personal computer 10 including the user interface device 10A is configured as a computer, etc. equipped with an arithmetic processing unit such as a CPU (Central Processing Unit). In addition, the user interface device 10A includes an auxiliary storage device such as an HDD (Hard Disk Drive) that stores various control programs such as programs and an OS (Operating System), and a main storage device such as a RAM (Random Access Memory) for storing data temporarily required for the arithmetic processing unit to execute a program.

Then, in the user interface device 10A or the personal computer 10 including the user interface device 10A, the arithmetic processing unit reads the program and the OS from the auxiliary storage device, and performs arithmetic processing based on the program and the OS while loading the read program and OS in the main storage device. Further, based on a result of this arithmetic processing, various pieces of hardware provided in each device are controlled. In this way, the functional blocks of this embodiment are realized. In other words, this embodiment can be realized by cooperation of hardware and software.

Figure 8:
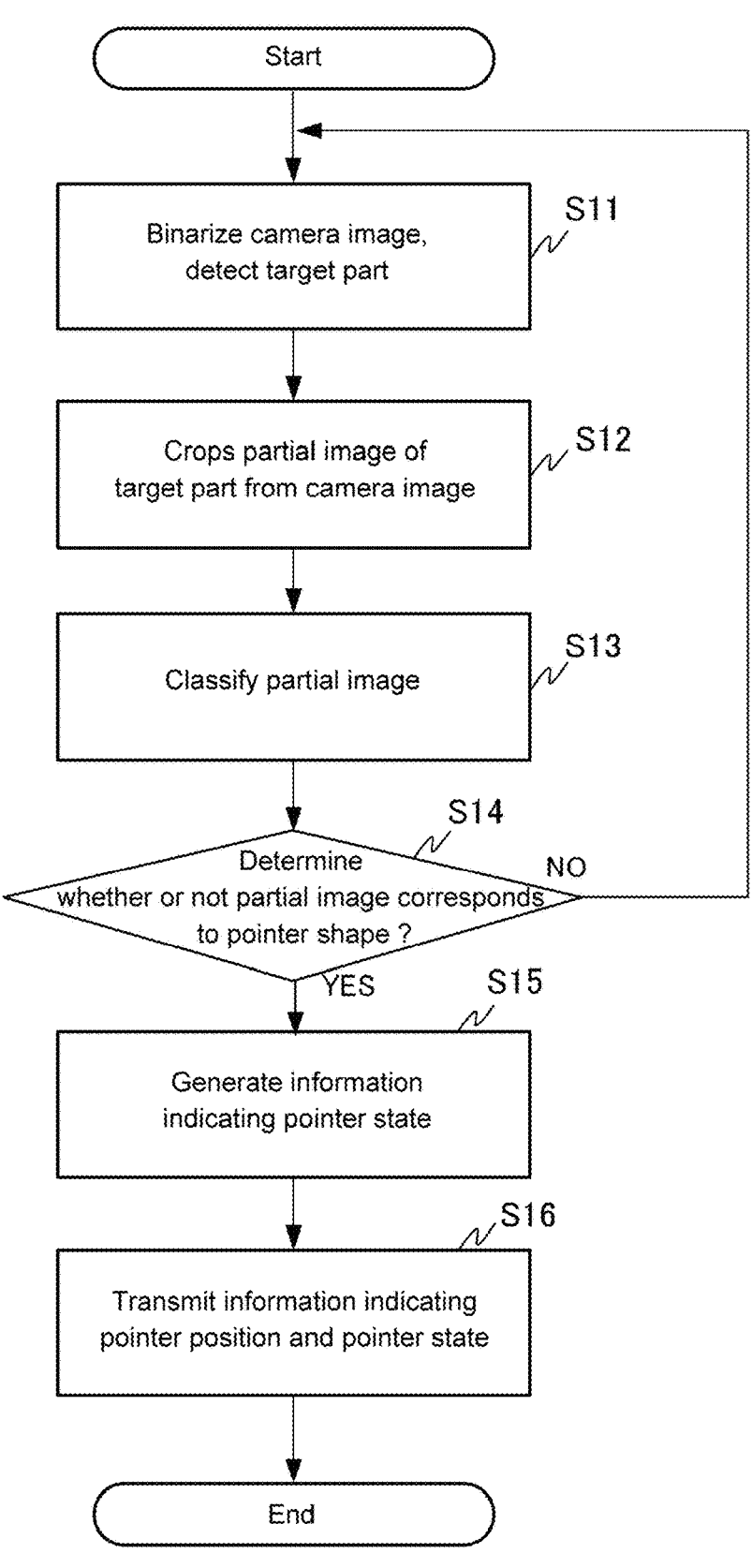
FIG. 8 is a flowchart illustrating an operation of the user interface device.

Next, an operation of the user interface device 10A will be described with reference to a flowchart. FIG. 8 is a flowchart illustrating the operation of the user interface device.

In step S11, the target detector 11 binarizes a camera image, detects a target part, and outputs a position of a fingertip on the image and a size of a region including the fingertip.

In step S12, the image cropping unit 12 crops a partial image corresponding to the detected position of the fingertip and the size of the region including the fingertip from a camera image output from the camera 20.

In step S13, the shape recognition unit 13 performs inference on the partial image cropped by the image cropping unit 12 using deep learning, classifies a shape, and outputs the classified shape.

In step S14, the pointer selector 14 determines whether or not the partial image corresponds to a pointer shape (class 0 and class 1 of FIG. 7). When the partial image corresponds to a pointer shape, the process proceeds to step S15, and when the partial image does not correspond to a pointer shape, the process returns to step S11.

In step S15, the pointer information generator 15 generates information indicating whether the pointer is in a selected state or a non-selected state depending on whether the partial image is class 0 or class 1.

In step S16, the pointer information transmitter 16 transmits information indicating the pointer position and pointer state to a calling application or an external host device.

To improve accuracy of the pointer, the user interface device of Embodiment 1 described above can be configured as any of user interface devices of the following Embodiments 2 to 4.

Embodiment 2

In the user interface system of Embodiment 1, the pointer may be in a moving state in some cases. In this case, when the pointer moves quickly on the display screen of the display device 30, it becomes difficult for the user to operate the pointer.

For example, when the thumb and the index finger are separated from each other and the pointer is in a non-selected state, the pointer may be in a moving state in some cases. Specifically, as illustrated in FIG. 1, when a number "2" is selected by pinching using the thumb and the index finger to input the number "2" to the numeric input field on the display screen of the display device 30, and then the number "2" is deleted, the pointer moves from above the number key "2" to above the delete key "DEL".

In this embodiment, to smooth movement of the pointer, the pointer information generator uses a past history of pointer coordinates to calculate a moving average and correct the coordinates of the pointer.

Figure 9:
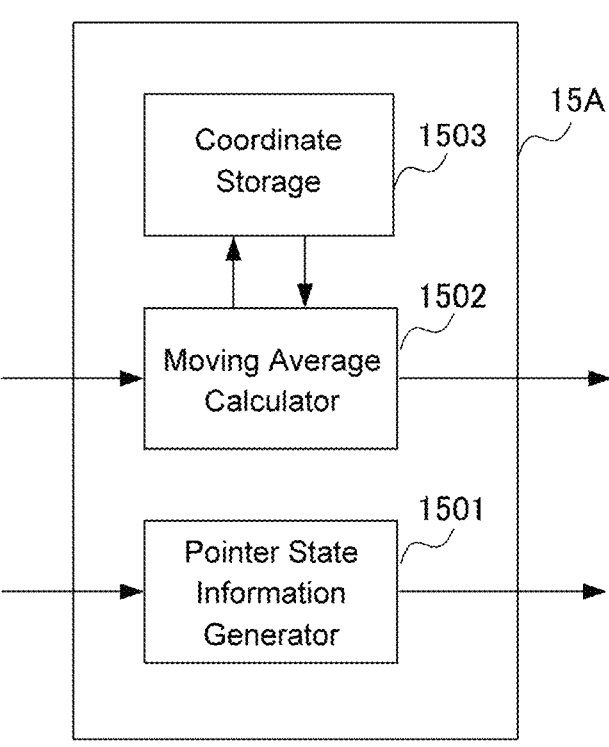
FIG. 9 is a block diagram illustrating a pointer calculator of a user interface of Embodiment 2 of the disclosure.

FIG. 9 is a block diagram illustrating a pointer information generator of a user interface device of Embodiment 2 of the disclosure. Configurations of the user interface device and a user interface system of this embodiment are the same as the configurations of the user interface device and the user interface system of Embodiment 1, except for a configuration of the pointer information generator.

In the user interface device of this embodiment, the pointer information generator 15 illustrated in FIG. 3 is replaced with a pointer information generator 15A.

As illustrated in FIG. 9, the pointer information generator 15 A includes a pointer state information generator 1501, a moving average calculator 1502, and a coordinate storage 1503.

The moving average calculator 1502 sequentially stores coordinates indicating the position of the pointer output from the pointer selector 14 as a history of pointer coordinates in the coordinate storage 1503. In response to input of coordinates indicating the position of the pointer from the pointer selector 14, the moving average calculator 1502 reads the history of the pointer coordinates stored in the coordinate storage 1503, calculates the moving average value, and outputs corrected coordinates of the pointer (information indicating a position of a partial image of the pointer).

The pointer state information generator 1501 performs a similar operation to that of the pointer information generator 15 illustrated in FIG. 3, generates information indicating whether the pointer is in a selected state or a non-selected state (information indicating the state of the pointer) depending on whether the partial image extracted by the pointer selector 14 is class 0 or class 1, and outputs the information to the pointer information transmitter 16.

Figure 10:
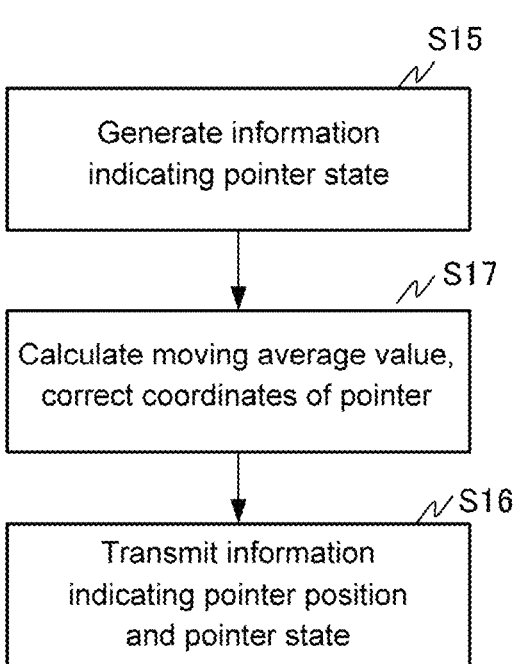
FIG. 10 is a flowchart illustrating an operation of a part of the user interface device of Embodiment 2 of the present disclosure.

An operation of the user interface device 10 including the pointer information generator 15A is the same as that illustrated in the flowchart of FIG. 8, except that step S17 is inserted after step S15. FIG. 10 is a flowchart illustrating an operation of a part of the user interface device of this embodiment.

In step S17, upon input of coordinates indicating the position of the pointer from the pointer selector 14, the moving average calculator 1502 reads the history of the pointer coordinates stored in the coordinate storage 1503, calculates the moving average value, and outputs corrected coordinates of the pointer. Step S17 may be performed simultaneously with step S15, or may be performed before step S15.

Embodiment 3

In the user interface system of Embodiment 1, when the shape (pointer state) is changed by an operation of the user, the coordinates of the pointer may be unintentionally shifted by the user. For example, as illustrated in FIG. 1, when the pointer moves onto the delete key "DEL" with the thumb and the index finger open to delete the number "2" input to the numeric input field on the display screen of the display device 30 and stops on the delete key "DEL", and the thumb and the index finger are pinched, the coordinates of the pointer may be unintentionally shifted by the user. Further, when the thumb and the index finger are opened from the pinched state of the thumb and the index finger, the coordinates of the pointer may be unintentionally shifted by the user.

In this embodiment, when the pointer state changes, the position of the pointer is locked, and the coordinates immediately before the selected state is changed are maintained.

Figure 11:
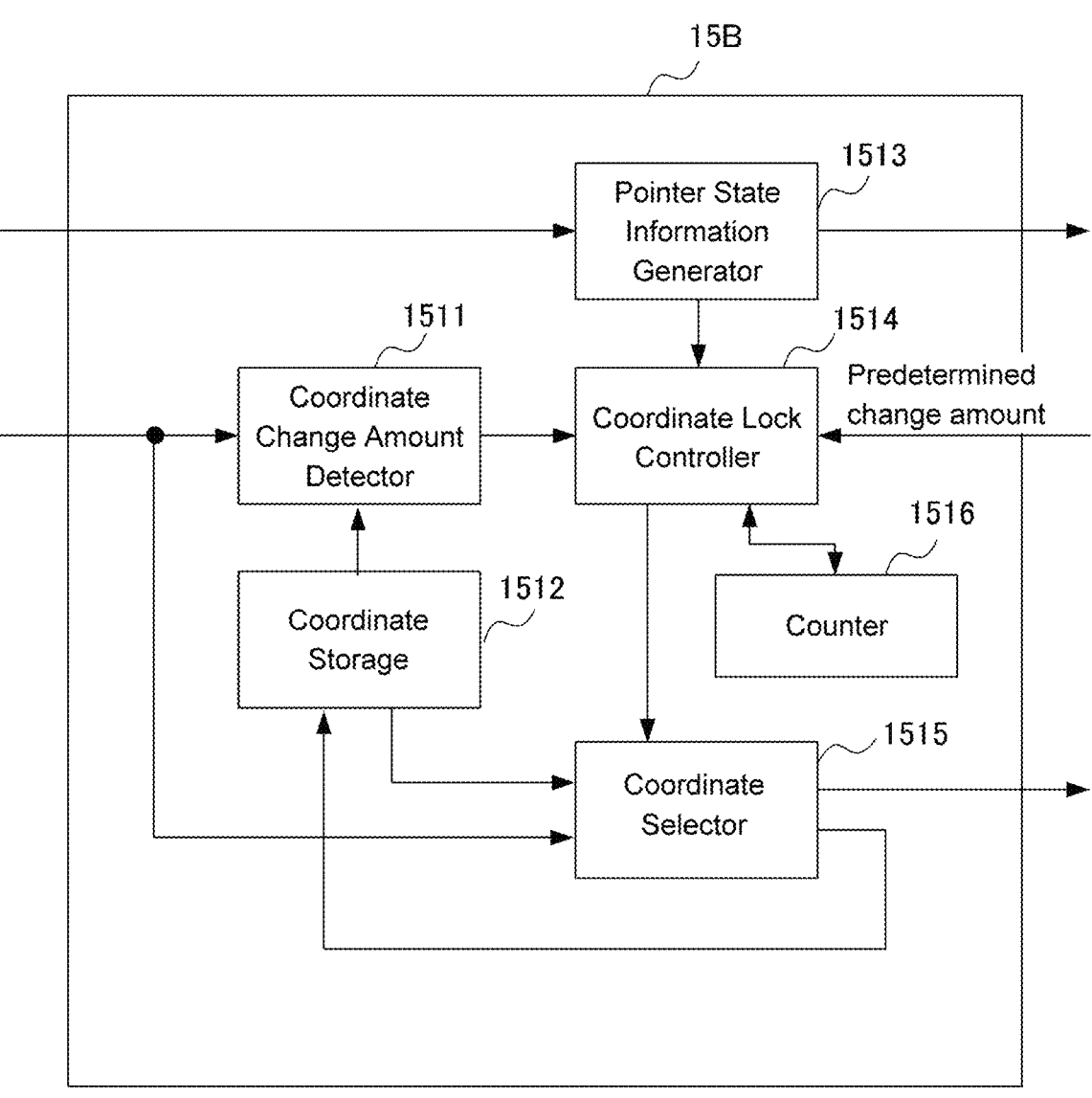
FIG. 11 is a block diagram illustrating a pointer calculator of a user interface of Embodiment 3 of the disclosure.

FIG. 11 is a block diagram illustrating a pointer information generator of a user interface device of Embodiment 3 of the disclosure. Configurations of the user interface device and a user interface system of this embodiment are the same as the configurations of the user interface device and the user interface system of Embodiment 1, except that a configuration of the pointer information generator is different.

In the user interface device of this embodiment, the pointer information generator 15 illustrated in FIG. 3 is replaced with a pointer information generator 15B.

As illustrated in FIG. 11, the pointer information generator 15B includes a coordinate change amount detector 1511, a coordinate storage 1512, a pointer state information generator 1513, a coordinate lock controller 1514, a coordinate selector 1515, and a counter 1516. The pointer state information generator 1513 has a similar function to that of the pointer state information generator 1501 illustrated in FIG. 9.

The coordinate storage 1512 sequentially stores coordinates (pointer coordinates) indicating the position of the pointer, which is output from the coordinate selector 1515.

Upon input of the coordinates (pointer coordinates) indicating the position of the pointer from the pointer selector 14, the coordinate change amount detector 1511 reads the pointer coordinates stored in the coordinate storage 1512, detects a coordinate change amount, and outputs the detected coordinate change amount to the coordinate lock controller 1514.

The pointer state information generator 1513 performs a similar operation to that of the pointer state information generator 1501 illustrated in FIG. 9, generates information indicating whether the pointer is in a selected state or a non-selected state (information indicating the state of the pointer) depending on whether the partial image extracted by the pointer selector 14 is class 0 or class 1, and outputs the information to the coordinate lock controller 1514 and the pointer information transmitter 16.

The coordinate lock controller 1514 detects change in the pointer state based on information indicating the pointer state output from the pointer state information generator 1513, and outputs a lock control signal to the coordinate selector 1515 to lock the position of the pointer when the pointer state changes.

The coordinate lock controller 1514 does not output a lock control signal when a change amount (corresponding to a movement amount) from immediately previous coordinates output from the coordinate change amount detector 1511 exceeds a predetermined change amount (corresponding to a movement amount) input. A reason therefor is that there is no need to lock the pointer position when the movement amount exceeds the predetermined movement amount in order to move to another key by opening the thumb and the index finger from the pinched state of the thumb and the index finger.

After outputting the lock control signal, the coordinate lock controller 1514 outputs a lock release control signal to the coordinate selector 1515 when the change amount (corresponding to the movement amount) from the previous coordinates output from the coordinate change amount detector 1511 exceeds the predetermined input change amount.

When no lock control signal is input, the coordinate selector 1515 outputs the coordinates indicating the position of the pointer (pointer coordinates) input from the pointer selector 14 to the coordinate storage 1512 and the pointer information transmitter 16.

On the other hand, when a lock control signal is input, the coordinate selector 1515 reads pointer coordinates immediately before locking stored in the coordinate storage 1512, and outputs the pointer coordinates to the coordinate storage 1512 and the pointer information transmitter 16. In this way, the pointer position is locked when the pointer state changes until the lock release control signal is input.

When a lock release control signal is input, the coordinate selector 1515 releases lock of the pointer position and outputs coordinates indicating the pointer position (pointer coordinates) input from the pointer selector 14 to the pointer information transmitter 16.

Note that, based on the information indicating the pointer state output from the pointer state information generator 1513, the coordinate lock controller 1514 may operate the counter 1516 that counts time when a change in the pointer state is detected, and output a lock release control signal to the coordinate selector 1515 when a predetermined time has elapsed.

Further, when a change in the pointer state is detected based on the information indicating the pointer state output from the pointer state information generator 1513, the counter 1516 may be operated, and the input predetermined change amount may be rewritten to a smaller value after a predetermined time has elapsed. In this way, the predetermined change amount serving as a criterion for outputting a lock release control signal becomes smaller, making it easier for the coordinate selector 1515 to release the lock.

When an elapsed time from detection of the change in the pointer state is not measured by the counter 1516, the counter 1516 does not have to be provided.

Note that, instead of measuring the elapsed time using the counter 1516, the coordinate lock controller 1514 may count the number of frames of the camera image, and output a lock release control signal to the coordinate selector 1515 or rewrite the input predetermined change amount to a smaller value when the number of frames exceeds a predetermined number.

Figure 12:
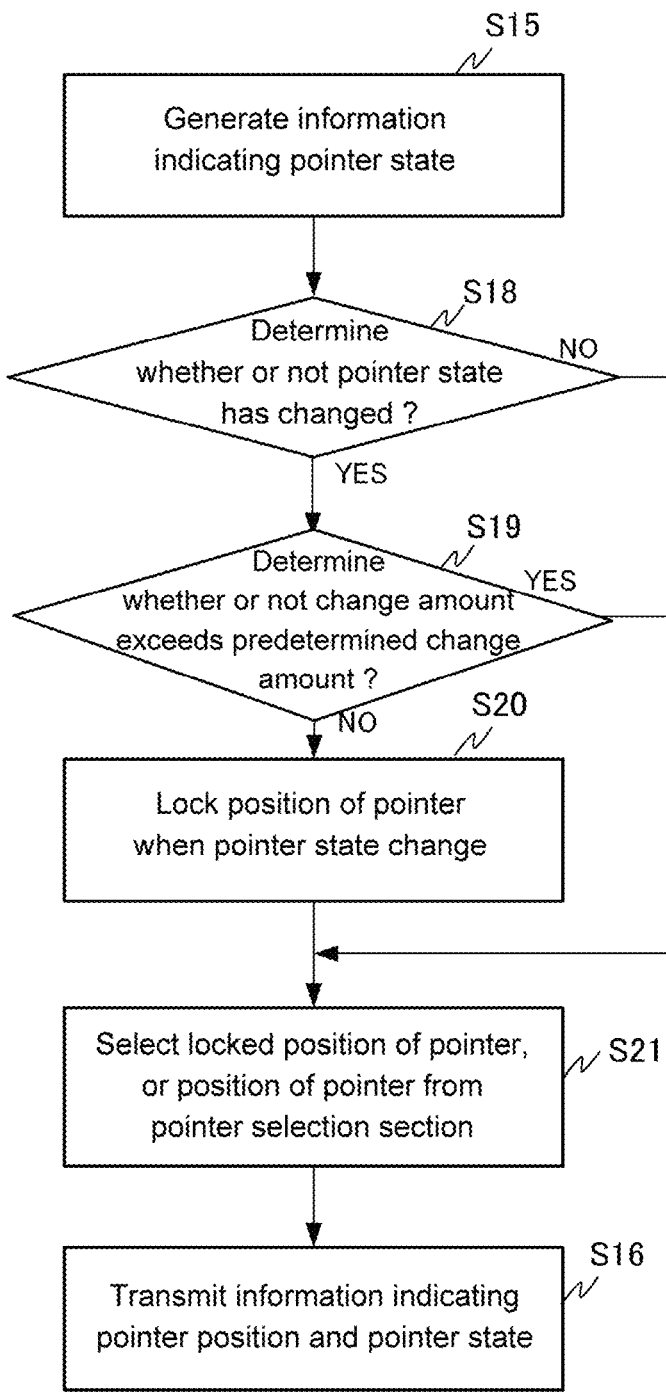
FIG. 12 is a flowchart illustrating an operation of a part of the user interface device of Embodiment 3 of the present disclosure.

An operation of the user interface device 10 including the pointer information generator 15B is the same as that illustrated in the flowchart of FIG. 8, except that steps S18 to S21 are inserted between steps S15 and S16. FIG. 12 is a flowchart illustrating an operation of a part of the user interface device of this embodiment.

In step S18, the coordinate lock controller 1514 detects a change in the pointer state and determines whether or not the pointer state has changed based on the information indicating the pointer state output from pointer state information generator 1513. When the pointer state has changed, the process proceeds to step S19, and when the pointer state has not changed, the process proceeds to step S21 without outputting a lock control signal.

In step S19, the coordinate lock controller 1514 determines whether or not the change amount (corresponding to the movement amount) from the coordinates immediately before locking, which is output from the coordinate change amount detector 1511, exceeds the input predetermined change amount. When the change amount (corresponding to the movement amount) exceeds the input predetermined change amount, the lock control signal is not output and the process proceeds to step S21. When the change amount does not exceed the input predetermined change amount, the process proceeds to step S20.

In step S20, to lock the position of the pointer when the pointer state changes, the lock control signal is output to the coordinate selector 1515. Then, when the lock control signal is input, the coordinate selector 1515 maintains (locks) the pointer coordinates immediately before the selected state changes.

In step S21, when the lock control signal is not input, the coordinate selector 1515 selects the input pointer coordinates and outputs the input pointer coordinates to the pointer information transmitter 16.

On the other hand, when the lock control signal is input, the coordinate selector 1515 reads the pointer coordinates stored in the coordinate storage 1512 immediately before locking, selects these pointer coordinates, and outputs the pointer coordinates to the pointer information transmitter 16. Then, the pointer coordinates immediately before the selected state changes are maintained (locked) until the lock release control signal is input. In addition, the pointer state information generator 1513 generates information indicating the state of the pointer, and outputs the information to the pointer information transmitter 16.

Embodiment 4

In the user interface system of Embodiment 1, pointer state information may be momentarily lost due to noise, etc. in some cases. To address a problem of the pointer state information being lost, in this embodiment, the pointer state is switched only when the same change state form occurs a predetermined number of times in succession.

Figure 13:
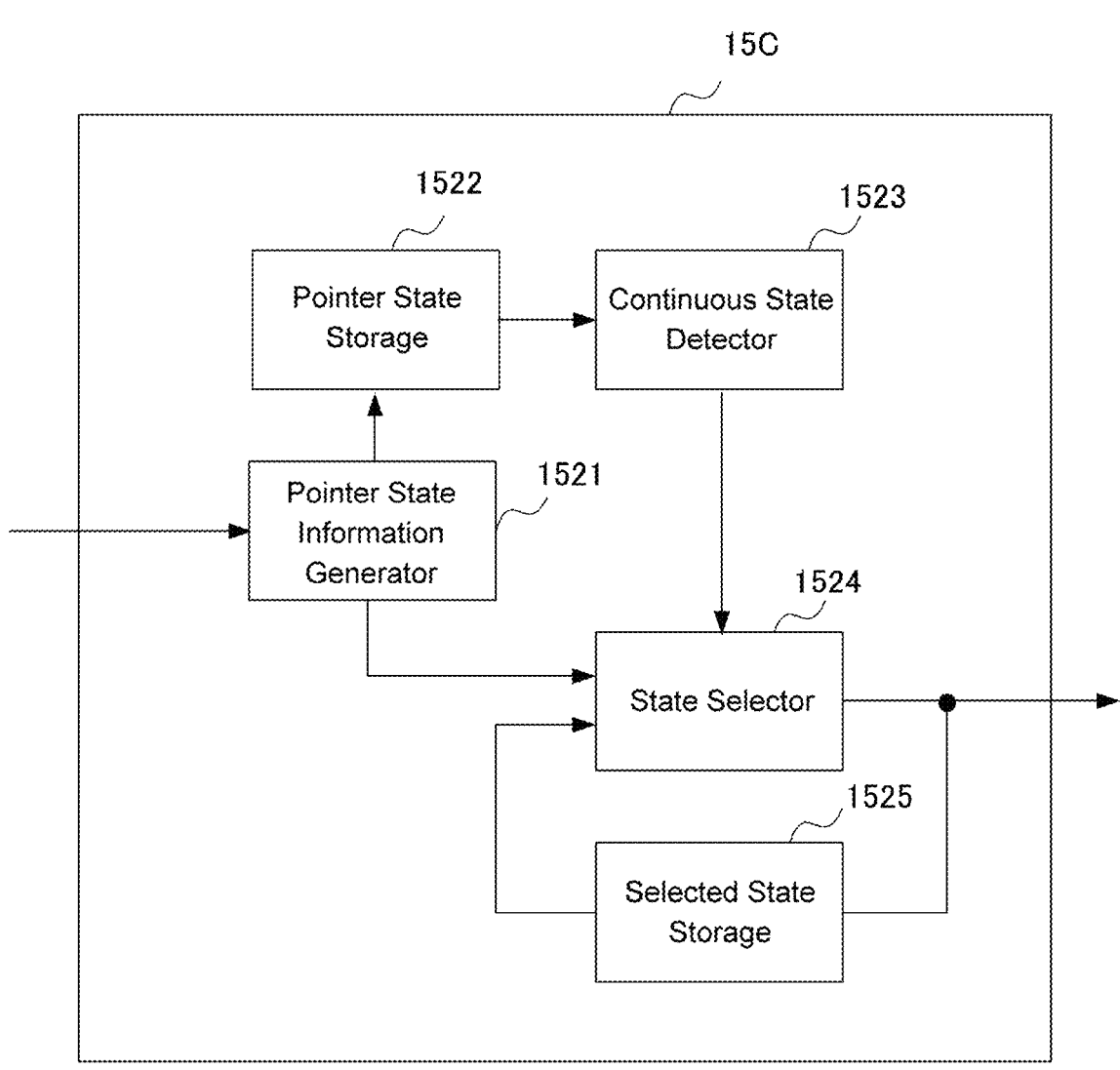
FIG. 13 is a block diagram illustrating a pointer calculator of a user interface of Embodiment 4 of the disclosure.

FIG. 13 is a block diagram illustrating a pointer information generator of a user interface device of Embodiment 4 of the disclosure. Configurations of the user interface device and a user interface system of this embodiment are the same as the configurations of the user interface device and the user interface system of Embodiment 1, except that a configuration of the pointer information generator is different.

In the user interface device of this embodiment, the pointer information generator 15 illustrated in FIG. 3 is replaced with a pointer information generator 15C.

As illustrated in FIG. 13, the pointer information generator 15C includes a pointer state information generator 1521, a pointer state storage 1522, a continuous state detector 1523, a state selector 1524, and a selected state storage 1525. The pointer state information generator 1521 has a similar function to that of the pointer state information generator 1501 illustrated in FIG. 9. Although not illustrated in FIG. 13, the pointer information generator 15C outputs information indicating the position of the partial image of the pointer to the pointer information transmitter 16.

The pointer state information generator 1521 performs a similar operation to that of the pointer state information generator 1501 illustrated in FIG. 9, generates information indicating whether the pointer is in a selected state or a non-selected state (information indicating the state of the pointer) depending on whether the partial image extracted by the pointer selector 14 is class 0 or class 1, sequentially stores the information indicating the state of the pointer in the pointer state storage 1522, and outputs the information to the state selector 1524.

The continuous state detector 1523 reads the state of the pointer from the pointer state storage 1522, and outputs a pointer state switching control signal to the state selector 1524 when the pointer state changes and the changed pointer state is detected a predetermined number of times in succession.

The state selector 1524 compares the pointer state output from the pointer state information generator 1521 with the pointer state read from the selected state storage 1525.

When the pointer state output from the pointer state information generator 1521 is the same as the pointer state read from the selected state storage 1525, the state selector 1524 outputs information indicating the pointer state to the pointer information transmitter 16 and stores the information in the selected state storage 1525.

On the other hand, when the pointer state output from the pointer state information generator 1521 is different from the pointer state read from the selected state storage 1525, the state selector 1524 switches the pointer state to the pointer state output from the pointer state information generator 1521, outputs the switched pointer state to the pointer information transmitter 16, and stores the switched pointer state in the selected state storage 1525 only when the pointer state switching control signal is received from the continuous state detector 1523. In the case of not receiving the pointer state switching control signal, the state selector 1524 outputs the pointer state read from the selected state storage 1525 to the pointer information transmitter 16 and stores the pointer state in the selected state storage 1525 without switching the pointer state output from the pointer state information generator 1521.

Figure 14:
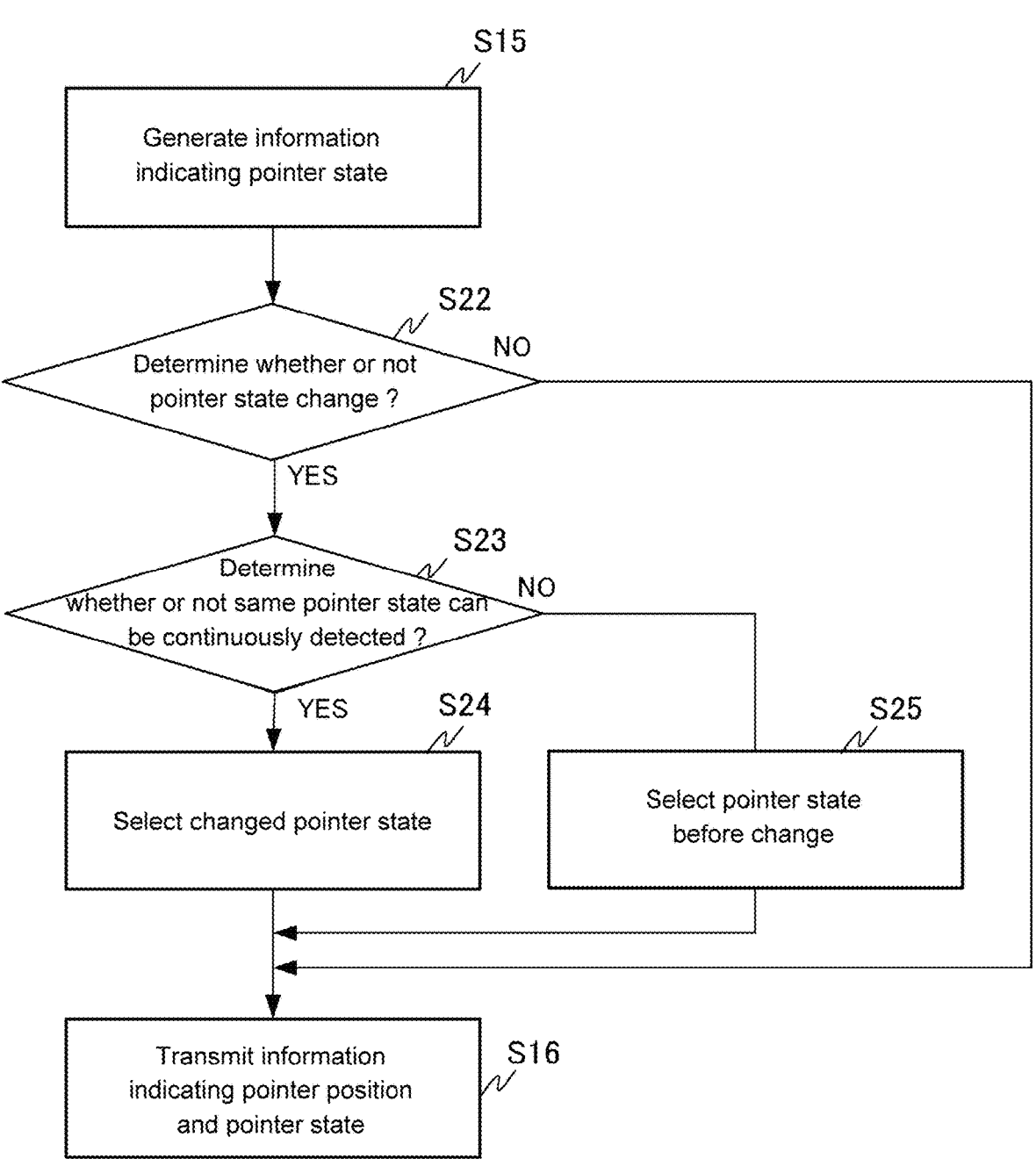
FIG. 14 is a flowchart illustrating an operation of a part of the user interface device of Embodiment 4 of the present disclosure.

An operation of the user interface device 10 including the pointer information generator 15C is the same as that illustrated in the flowchart of FIG. 8, except that steps S22 to S25 are inserted between steps S15 and S16. FIG. 14 is a flowchart illustrating an operation of a part of the user interface device of this embodiment.

In step S22, the continuous state detector 1523 reads the state of the pointer from the pointer state storage 1522 and determines whether or not the pointer state changes. When the pointer state changes, the process proceeds to step S23, and when the pointer state does not change, the process proceeds to step S16.

In step S23, the continuous state detector 1523 reads the history of the pointer state from the pointer state storage 1522 and determines whether the changed pointer state can be detected a predetermined number of times in succession. When the same pointer state can be detected in succession, a pointer state switching control signal is output to the state selector 1524 and the process proceeds to step S24, and when the same pointer state cannot be detected in succession, the process proceeds to step S25.

In step S24, the state selector 1524 selects the changed pointer state output from the pointer state information generator 1521.

In step S25, the state selector 1524 selects the pointer state before the change read from the selected state storage 1525.

Embodiment 5

In an application that does not display a camera image and a recognition state thereof on a display, when the user accidentally removes a hand from a field of view of a camera, and this is not recognized by the user interface device, it is difficult to recognize this abnormality.

In this embodiment, a notification unit is provided to notify the user of a recognition status by sound or light.

Figure 15:
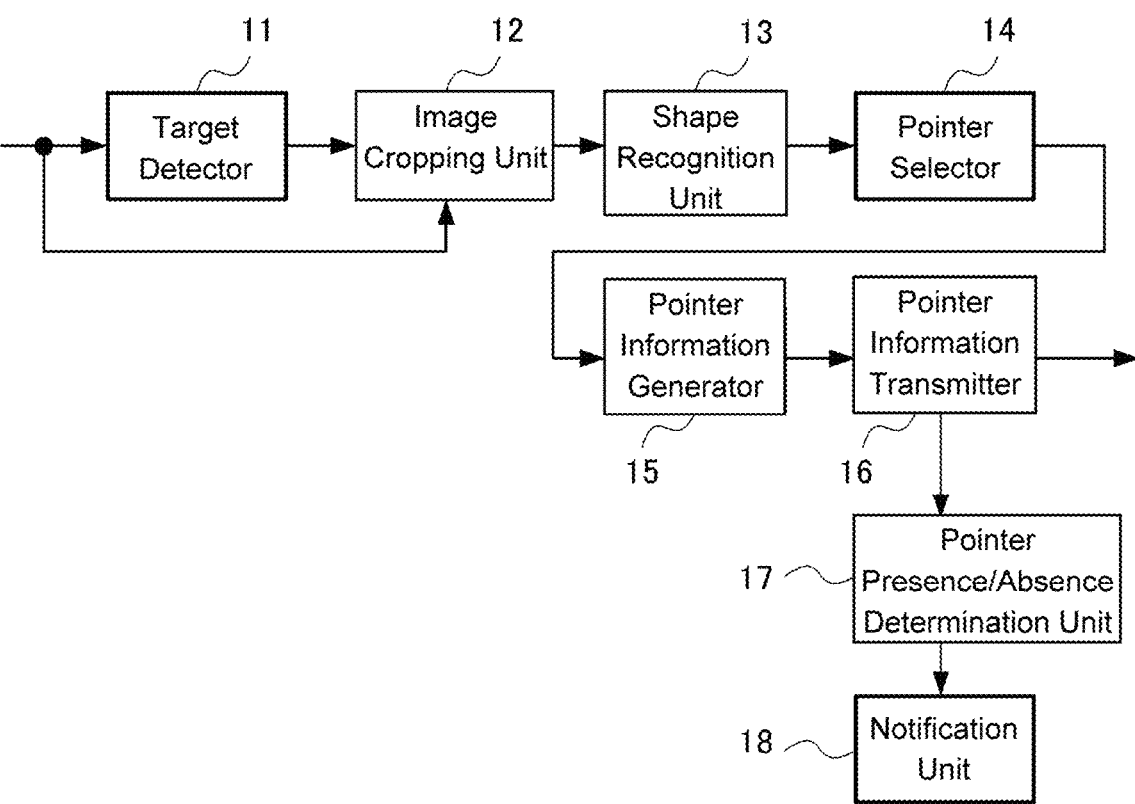
FIG. 15 is a block diagram illustrating a pointer calculator of a user interface of Embodiment 5 of the disclosure.

FIG. 15 is a block diagram illustrating a pointer information generator of a user interface device according to Embodiment 5 of the disclosure.

In the user interface device of this embodiment, a pointer presence/absence determination unit 17 and a notification unit 18 are added to the user interface device 10A illustrated in FIG. 3.

The pointer presence/absence determination unit 17 determines whether or not the position of the pointer is outside a region of the camera image.

The notification unit 18 is a sound device that notifies the user of the recognition status using sound, or a light-emitting element such as an LED that notifies the user of the recognition status using light when the pointer position is outside the region of the camera image based on a determination result of the pointer presence/absence determination unit 17.

When the sound device is used, the notification unit 18 notifies the user of the recognition status by changing user interface operation sound or by turning on/off the user interface operation sound according to the recognition status of the pointer.

When the light-emitting element such as the LED is used, the notification unit 18 notifies the user of the recognition status by attaching the LED to the user interface device 10A and turning on/off emitted light color or emitted light so that the LED flickers.

Figure 16:
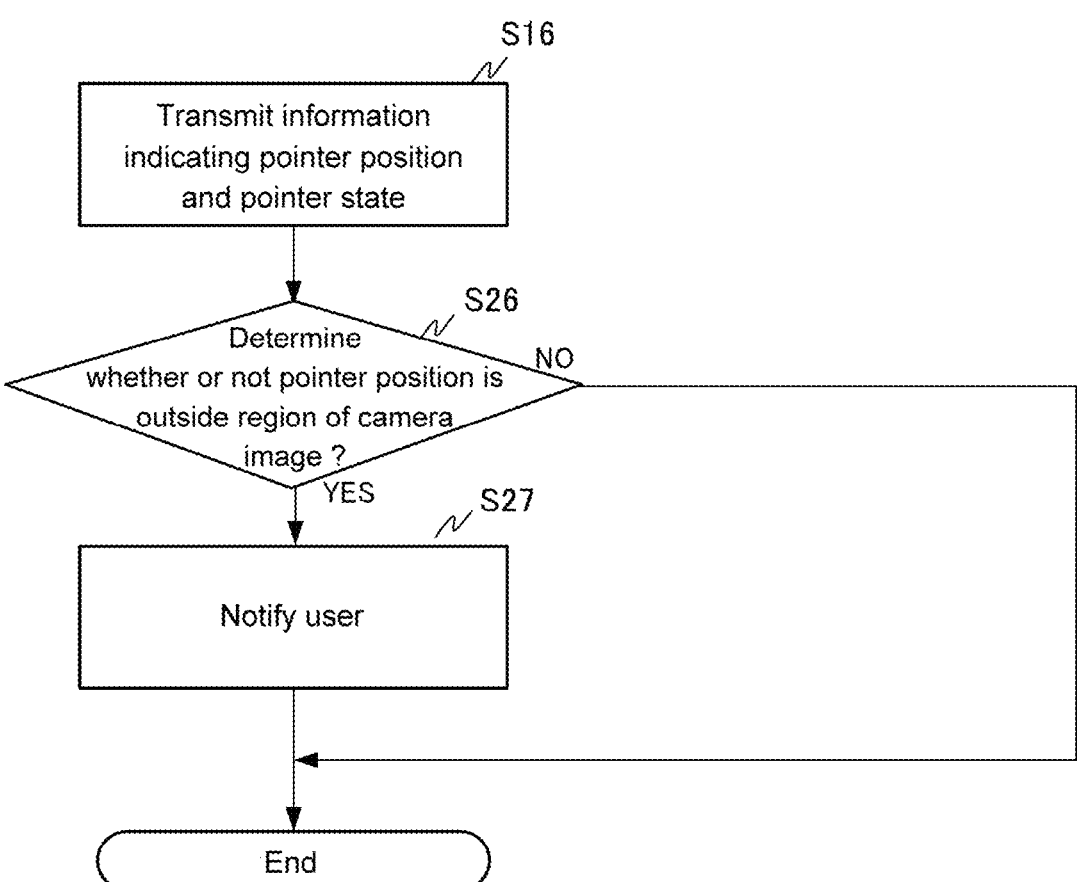
FIG. 16 is a flowchart illustrating an operation of a part of the user interface device of Embodiment 5 of the present disclosure.

A flowchart of an operation of the user interface device 10A including the pointer presence/absence determination unit 17 and the notification unit 18 is the same as the flowchart illustrated in FIG. 8, except that steps S26 and S27 are inserted after step S16 illustrated in FIG. 8. FIG. 16 is a flowchart illustrating an operation of a part of the user interface device of this embodiment.

In step S26, the pointer presence/absence determination unit 17 determines whether or not the pointer position is outside the region of the camera image. When the pointer position is outside the region of the camera image, the process proceeds to step S27, and when the pointer position is not outside the region of the camera image, the process ends.

In step S27, the notification unit 18 notifies the user of the recognition status. Thereafter, the process ends.

In Embodiments 1 to 5 of the disclosure, a description has been given above using an example in which the thumb and the index finger are used as indicators, and a selection target selected by an action of pinching using the thumb and the index finger is a numeric keypad. However, in some cases, a pinching action using both hands may be desired for selection depending on the selection target. For example, when the selection target is a keyboard, it is desired to use both hands to input characters in some cases. In this case, it is sufficient to divide an image of the keyboard into two parts, and perform a search for each of the right and left images along two axes.

In this embodiment, only two types, class 0 and class 1, are assigned to the pointer to represent the two states, selected and non-selected. However, in other embodiments, four forms can be assigned to the pointer to represent selected/non-selected states of button A and selected/non-selected states of button B.

For example, in FIG. 7, in addition to classes 0 and 1, classes 4 and 5 can be assigned to the pointer, so that class 1 and class 0 may be set to pointers for selecting/deselecting button A, and class 5 and class 4 may be set to pointers for selecting/deselecting button B.

Instead of the two types of pointers, class 0 and class 1, two types of pointers, class 4 and class 5, may be used.

Figure 17:
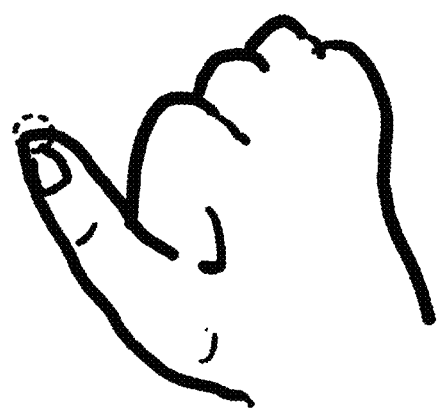
FIG. 17 is a diagram illustrating an aspect in which a non-selected state is represented by a spread thumb.
Figure 18:
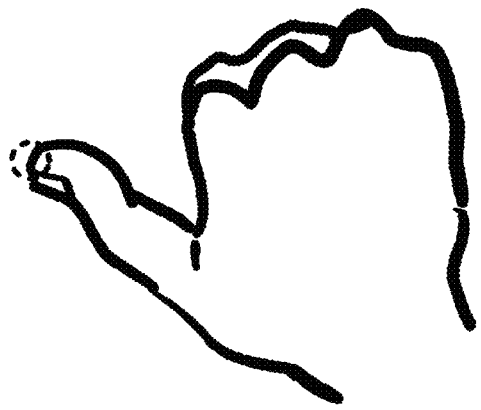
FIG. 18 is a diagram illustrating an aspect in which a selected state is represented by rotating the spread thumb.

Embodiments 1 to 5 of the disclosure are not limited to a pinching action of the thumb and the index finger. As illustrated in FIG. 17 and FIG. 18, when the spread thumb is rotated from a shape illustrated in FIG. 17 to a shape illustrated in FIG. 18, a surface of a thumb nail can be rotated by 90° to represent non-selection and selection. In FIG. 17 and FIG. 18, a region of a dotted line indicates a fingertip.

In addition, the disclosure can be applied to a camera image that includes an indicator, and the indicator is not limited to the thumb and the index finger. For example, non-selection and selection can be represented using a shape such as rock-paper-scissors in an image from a wrist down.

Furthermore, an image can be captured using a camera at an angle from a long distance away, a position can be indicated by a standing position of a person in the camera image, and a state can be indicated by raising and lowering a hand (in a cheer or horizontal open gesture).

In Embodiments 2 to 5 of the disclosure, two embodiments or three or more embodiments can be appropriately combined. For example, Embodiment 2 and Embodiment 3 can be combined to smooth movement of the pointer and inhibit coordinates of the pointer from being unintentionally shifted when the shape (pointer state) is changed by an operation of the user.

Embodiments 2 to 4 described above are based on two-axis search of Embodiment 1. However, Embodiments 2 to 4 are configurations for improving accuracy of the pointer, and configurations other than the pointer information generator are not limited to those of Embodiment 1. For example, when the right hand or the left hand is specified in advance, the target detector 11 can find the fingertip even one-axis search is used.

In addition, Embodiment 5 is based on any one of Embodiments 1 to 4. However, Embodiment 5 is a configuration for notification when the indicator moves out of the camera image, and is not limited to the configurations of Embodiments 1 to 4.

Embodiments of the disclosure have been described above. Each component included in the user interface device of this embodiment can be realized by hardware, software, or a combination thereof. In addition, a servo control method performed by cooperation of each component included in the above control system can also be realized by hardware, software, or a combination thereof. Here, "realized by software" means "realized by a computer reading and executing a program".

The program can be stored and provided to the computer using various types of non-transitory computer readable media. The non-transitory computer readable media includes various types of tangible storage media. Examples of the non-transitory computer readable media include magnetic recording media (for example, hard disk drives), magneto-optical recording media (for example, magneto-optical disks), CD-ROMs (Read Only Memories), CD-Rs, CD-R/Ws, semiconductor memories (for example, mask ROMs and PROMs (Programmable ROMs), EPROMs (Erasable PROMs), flash ROMs, and RAMs (random access memories)).

Even though each of the above-described embodiments is a preferred embodiment of the disclosure, the scope of the disclosure is not limited to only the above-described embodiments, and the disclosure can be implemented in various modified forms without departing from the gist of the disclosure.

The user interface device, the user interface system, and the user interface program according to the disclosure can take various types of embodiments having the following configurations, including the above-described embodiments.

(1) A user interface device configured to specify an indication by identifying a shape of an indicator based on a camera image obtained by capturing the indicator having the shape that changes for the indication, the user interface device including a detector configured to search an image obtained by binarizing the camera image in at least two different diagonal directions to detect an end of an object included in the camera image, an image cropping unit configured to crop a partial image from the camera image based on the detected end, a selector configured to select a partial image indicating a shape before the indication and a partial image indicating a shape of the indication by the indicator when the partial image is a partial image obtained by capturing the indicator as the object, and an information generator configured to generate information indicating whether the indicator has the shape before the indication or the shape of the indication.

According to this user interface device, it is possible to accurately detect a location of the indicator in the camera image and a shape of the indicator.

(2) The user interface device according to (1), including a shape recognition unit configured to classify the partial image by deep learning, wherein the selector selects a partial image in which the indicator indicates the shape before the indication and a partial image in which the indicator indicates the shape of the indication from the classified partial image.

According to this user interface device, it is possible to achieve both reduction in computational costs and highly flexible recognition by combining image recognition using a mechanical two-axis search with image deep learning.

(3) The user interface device according to (1) or (2), wherein the indicator is a thumb and an index finger of a user, and the shape before the indication is a state in which the thumb and the index finger are open, and the shape of the indication is a state in which the thumb and the index finger are in contact.

(4) The user interface device according to any one of (1) to (3), wherein the information generator includes a coordinate storage configured to store coordinates indicating a position of the indicator, and a moving average value calculator configured to read a history of the coordinates stored in the coordinate storage, obtain a moving average value, correct the input coordinates using the moving average value, and output the corrected coordinates in response to input of the coordinates indicating the position of the indicator, and the coordinates indicating the position of the indicator are output from the selector.

According to this user interface device, it is possible to smooth movement of the indicator.

(5) The user interface device according to any one of (1) to (4), wherein the information generator includes a coordinate storage configured to store coordinates indicating a position of the indicator, a coordinate lock controller configured to detect a change in the shape of the indicator and outputs a lock control signal for locking the position of the indicator when the shape changes based on the generated information indicating whether the indicator has the shape before the indication or the shape of the indication, and a coordinate selector configured to output the input coordinates indicating the position of the indicator when the lock control signal is not input, and to read coordinates of the indicator immediately before locking stored in the coordinate storage, maintain the coordinates of the indicator immediately before a shape changes, and output the coordinates of the indicator when the lock control signal is input, and the coordinates indicating the position of the indicator are output from the selector.

According to this user interface device, it is possible to inhibit coordinates of the indicator from being unintentionally shifted by the user when the shape of the indicator changes due to a user operation.

(6) The user interface device according to (5), including a coordinate change amount detector configured to detect a coordinate change amount by reading the coordinates indicating the position of the indicator immediately before locking from the coordinate storage in response to input of the coordinates indicating the position of the indicator, wherein in a case of detecting the change in the shape of the indicator, when a change amount from the immediately previous coordinates does not exceed an input predetermined change amount, the coordinate lock controller outputs the lock control signal, and when the change amount exceeds the input predetermined change amount, the coordinate lock controller does not output the lock control signal and outputs a lock release control signal when the change amount from the immediately previous coordinates exceeds the input predetermined change amount after the lock control signal is output, and in a case of receiving the lock release control signal, the coordinate selector releases maintaining of the coordinates of the indicator and outputs the input coordinates indicating the position of the indicator.

(7) The user interface device according to (5), wherein

16 the coordinate lock controller detects a change in the shape of the indicator and outputs a lock release control signal when a predetermined time elapses after the lock control signal is output, and in a case of receiving the lock release control signal, the coordinate selector releases maintaining of the coordinates of the indicator and outputs the input coordinates indicating the position of the indicator.

(8) The user interface device according to (6), wherein the coordinate lock controller detects a change in the shape of the indicator and rewrites the input predetermined change amount to a value smaller than the predetermined change amount when a predetermined time elapses after the lock control signal is output.

(9) The user interface device according to any one of (1) to (8), wherein the information generator includes a storage configured to store information indicating whether the generated indicator is in a state of the shape before the indication or in a state of the shape of the indication, a continuous state detector configured to read the state of the pointer from the storage, and outputs a switching control signal in the state of the indicator when the state of the indicator changes and the changed state of the indicator is detected a predetermined number of times in succession, a state selector configured to switch a state output before input to a state indicated by input information in response to receiving the switching control signal when information indicating whether the generated indicator is in the state of the shape before the indication or a state of the shape of the indication, and a state indicated by the input information is different from a state output before the input, and a selected state storage configured to store the state output before the input.

According to this user interface device, it is possible to inhibit pointer information from being momentarily lost due to noise, etc.

(10) The user interface device according to any one of (1) to (9), including a determination unit configured to determine whether or not the position of the indicator is outside a region of the camera image, and a notification unit configured to notify the user when the position of the indicator is outside the region of the camera image.

According to this user interface device, it is possible to notify the user of a situation in which the position of the indicator has moved outside the region of the camera image.

(11) A user interface system including the user interface device according to any one of (1) to (10), an imaging device configured to capture an indicator having a shape that changes for an indication, and a display device configured to display a display screen operated based on information indicating whether the indicator output from the user interface device has a shape before the indication or a shape of the indication.

According to this user interface system, it is possible to accurately detect a location of the indicator in a camera image and a shape of the indicator, and operate the display screen of the display device based on a detection result.

(12) A user interface program configured to cause a computer to execute a detection function of performing a search in at least two different diagonal directions to detect an end of an object included in a camera image, an image cropping function of cropping a partial image from the camera image based on the detected end, a selection function of selecting a partial image indicating a shape before an indication and a partial image indicating a shape of the indication by an indicator when the partial image is a partial image obtained by capturing the indicator having a shape that changes for the indication as the object, and an information generation function of generating information indicating whether the indicator has the shape before the indication or the shape of the indication.

According to this user interface program, it is possible to accurately detect a location of the indicator in the camera image and a shape of the indicator.

In addition to the above-described embodiments (1) to (12), the disclosure can also be recognized as the following embodiments.

(13) A user interface device configured to specify an indication by identifying a shape of an indicator based on a camera image obtained by capturing the indicator having the shape that changes for the indication, the user interface device including an image cropping unit configured to crop a partial image from the camera image, a selector configured to select a partial image indicating a shape before the indication and a partial image indicating a shape of the indication by the indicator when the partial image is a partial image obtained by capturing the indicator as the object, and an information generator configured to generate information indicating whether the indicator has the shape before the indication or the shape of the indication, wherein the information generator includes a coordinate storage configured to store coordinates indicating a position of the indicator, and a moving average value calculator configured to read a history of the coordinates stored in the coordinate storage, obtain a moving average value, correct the input coordinates using the moving average value, and output the corrected coordinates in response to input of the coordinates indicating the position of the indicator, and the coordinates indicating the position of the indicator are output from the selector.

According to this user interface device, it is possible to smooth movement of the indicator.

(14) A user interface device configured to specify an indication by identifying a shape of an indicator based on a camera image obtained by capturing the indicator having the shape that changes for the indication, the user interface device including an image cropping unit configured to crop a partial image from the camera image, a selector configured to select a partial image indicating a shape before the indication and a partial image indicating a shape of the indication by the indicator when the partial image is a partial image obtained by capturing the indicator as the object, and an information generator configured to generate information indicating whether the indicator has the shape before the indication or the shape of the indication, wherein the information generator includes a coordinate storage configured to store coordinates indicating a position of the indicator, a coordinate lock controller configured to detect a change in the shape of the indicator and outputs a lock signal for locking the position of the indicator when the shape changes based on the generated information indicating whether the indicator has the shape before the indication or the shape of the indication, and a coordinate selector configured to output the input coordinates indicating the position of the indicator when the lock control signal is not input, and to read coordinates of the indicator immediately before locking stored in the coordinate storage, maintain the coordinates of the indicator immediately before a shape changes, and output the coordinates of the indicator when the lock control signal is input, and the coordinates indicating the position of the indicator are output from the selector.

According to this user interface device, it is possible to inhibit coordinates of the indicator from being unintentionally shifted by the user when the shape of the indicator changes due to a user operation.

(15) The user interface device according to (14), including a coordinate change amount detector configured to detect a coordinate change amount by reading the coordinates indicating the position of the indicator immediately before locking from the coordinate storage in response to input of the coordinates indicating the position of the indicator, wherein in a case of detecting the change in the shape of the indicator, when a change amount from the immediately previous coordinates does not exceed an input predetermined change amount, the coordinate lock controller outputs the lock control signal, and when the change amount exceeds the input predetermined change amount, the coordinate lock controller does not output the lock control signal and outputs a lock release control signal when the change amount from the immediately previous coordinates exceeds the input predetermined change amount after the lock control signal is output, and in a case of receiving the lock release control signal, the coordinate selector releases maintaining of the coordinates of the indicator and outputs the input coordinates indicating the position of the indicator.

(16) The user interface device according to (14), wherein the coordinate lock controller detects a change in the shape of the indicator and outputs a lock release control signal when a predetermined time elapses after the lock control signal is output, and in a case of receiving the lock release control signal, the coordinate selector releases maintaining of the coordinates of the indicator and outputs the input coordinates indicating the position of the indicator.

(17) The user interface device according to (15), wherein the coordinate lock controller detects a change in the shape of the indicator and rewrites the input predetermined change amount to a value smaller than the predetermined change amount when a predetermined time elapses after the lock control signal is output.

(18) A user interface device configured to specify an indication by identifying a shape of an indicator based on a camera image obtained by capturing the indicator having the shape that changes for the indication, the user interface device including an image cropping unit configured to crop a partial image from the camera image,

a selector configured to select a partial image indicating a shape before the indication and a partial image indicating a shape of the indication by the indicator when the partial image is a partial image obtained by capturing the indicator as the object, and an information generator configured to generate information indicating whether the indicator has the shape before the indication or the shape of the indication, wherein the information generator includes a storage configured to store information indicating whether the generated indicator is in a state of the shape before the indication or in a state of the shape of the indication, a continuous state detector configured to read the state of the pointer from the storage, and outputs a switching control signal in the state of the indicator when the state of the indicator changes and the changed state of the indicator is detected a predetermined number of times in succession, a state selector configured to switch a state output before input to a state indicated by input information in response to receiving the switching control signal when information indicating whether the generated indicator is in the state of the shape before the indication or a state of the shape of the indication, and a state indicated by the input information is different from a state output before the input, and a selected state storage configured to store the state output before the input.

According to this user interface device, it is possible to inhibit pointer information from being momentarily lost due to noise, etc.

(19) A user interface device configured to specify an indication by identifying a shape of an indicator based on a camera image obtained by capturing the indicator having the shape that changes for the indication, the user interface device including an image cropping unit configured to crop a partial image from the camera image, a selector configured to select a partial image indicating a shape before the indication and a partial image indicating a shape of the indication by the indicator when the partial image is a partial image obtained by capturing the indicator as the object, and an information generator configured to generate information indicating whether the indicator has the shape before the indication or the shape of the indication, wherein the user interface device includes a determination unit configured to determine whether or not the position of the indicator is outside a region of the camera image, and a notification unit configured to notify the user when the position of the indicator is outside the region of the camera image.

According to this user interface device, it is possible to notify the user of a situation in which the position of the indicator has moved outside the region of the camera image.

(20) A user interface system including the user interface device according to any one of (13) to (19), an imaging device configured to capture an indicator having a shape that changes for an indication, and a display device configured to display a display screen operated based on information indicating whether the indicator output from the user interface device has a shape before the indication or a shape of the indication.

(21) A computer readable non-transitory recording medium recording a user interface program configured to cause a computer to execute a function of each unit of the user interface device according to any one of (13) to (19).

It is to be noted that, as used herein and in the appended claims, the singular forms "a", "an", and "the" include plural referents unless the context clearly dictates otherwise.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A user interface device configured to specify an indication by identifying a shape of an indicator based on a camera image obtained by capturing the indicator having the shape that changes for the indication, the user interface device comprising:

a detector configured to search an image obtained by binarizing the camera image in at least two different diagonal directions to detect one end of an object included in the camera image;

an image cropping unit configured to crop a partial image corresponding to a detected position of the end of the object and a size of a region including the end of the object from the camera image based on the detected end;

an extraction selection configured to extract a partial image indicating a shape before the indication which is a pointer in a non-selected state and a partial image indicating a shape of the indication which is a pointer in a selected state from partial images; and an information generator configured to generate information indicating whether the indicator has the shape before the indication which is the pointer in a non-selected state or the shape of the indication which is the pointer in a selected state.

2. The user interface device according to claim 1, comprising a shape recognition unit configured to classify the partial image by deep learning, wherein the extraction selection extracts a partial image in which the indicator indicates the shape before the indication and a partial image in which the indicator indicates the shape of the indication from the classified partial image.

3. The user interface device according to claim 1, wherein:

the indicator is a thumb and an index finger of a user, and the shape before the indication is a state in which the thumb and the index finger are open, and the shape of the indication is a state in which the thumb and the index finger are in contact.

4. The user interface device according to claim 1, wherein:

the information generator includes a coordinate storage configured to store coordinates indicating a position of the indicator, and a moving average value calculator configured to read a history of the coordinates stored in the coordinate storage, obtain a moving average value, correct the input coordinates using the moving average value, and output the corrected coordinates in response to input of the coordinates indicating the position of the indicator, and the coordinates indicating the position of the indicator are output from the extraction selection.

5. The user interface device according to claim 1, wherein:

the information generator includes a coordinate storage configured to store coordinates indicating a position of the indicator, a coordinate lock controller configured to detect a change in the shape of the indicator and outputs a lock control signal for locking the position of the indicator when the shape changes based on the generated information indicating whether the indicator has the shape before the indication or the shape of the indication, and a coordinate selector configured to output the input coordinates indicating the position of the indicator when the lock control signal is not input, and to read coordinates of the indicator immediately before locking stored in the coordinate storage, maintain the coordinates of the indicator immediately before a shape changes, and output the coordinates of the indicator when the lock control signal is input, and the coordinates indicating the position of the indicator are output from the coordinate selector.

6. The user interface device according to claim 5, comprising a coordinate change amount detector configured to detect a coordinate change amount by reading the coordinates indicating the position of the indicator immediately before locking from the coordinate storage in response to input of the coordinates indicating the position of the indicator, wherein:

in a case of detecting the change in the shape of the indicator, when a change amount from the immediately previous coordinates does not exceed an input predetermined change amount, the coordinate lock controller outputs the lock control signal, and when the change amount exceeds the input predetermined change amount, the coordinate lock controller does not output the lock control signal and outputs a lock release control signal when the change amount from the immediately previous coordinates exceeds the input predetermined change amount after the lock control signal is output, and in a case of receiving the lock release control signal, the coordinate selector releases maintaining of the coordinates of the indicator and outputs the input coordinates indicating the position of the indicator.

7. The user interface device according to claim 5, wherein:

the coordinate lock controller detects a change in the shape of the indicator and outputs a lock release control signal when a predetermined time elapses after the lock control signal is output, and in a case of receiving the lock release control signal, the coordinate selector releases maintaining of the coordinates of the indicator and outputs the input coordinates indicating the position of the indicator.

8. The user interface device according to claim 6, wherein the coordinate lock controller detects a change in the shape of the indicator and rewrites the input predetermined change amount to a value smaller than the predetermined change amount when a predetermined time elapses after the lock control signal is output.

9. The user interface device according to claim 1, wherein the information generator includes a storage configured to store information indicating whether the generated indicator is in a state of the shape before the indication or in a state of the shape of the indication, a continuous state detector configured to read the state of the pointer from the storage, and outputs a switching control signal in the state of the indicator when the state of the indicator changes and the changed state of the indicator is detected a predetermined number of times in succession, a state selector configured to switch a state output before input to a state indicated by input information in response to receiving the switching control signal when information indicating whether the generated indicator is in the state of the shape before the indication or a state of the shape of the indication, and a state indicated by the input information is different from a state output before the input, and a selected state storage configured to store the state output before the input.

10. The user interface device according to claim 1, comprising:

a determination unit configured to determine whether or not the position of the indicator is outside a region of the camera image; and a notification unit configured to notify the user when the position of the indicator is outside the region of the camera image.

11. A user interface system comprising:

the user interface device according to claim 1;

an imaging device configured to capture an indicator having a shape that changes for an indication; and a display device configured to display a display screen operated based on information indicating whether the indicator output from the user interface device has a shape before the indication or a shape of the indication.

12. A computer readable non-transitory recording medium recording a user interface program configured to cause a computer to execute:

a detection function of performing a search in at least two different diagonal directions to detect one end of an object included in a camera image;

an image cropping function of cropping a partial image corresponding to a detected position of the end of the object and a size of a region including the end of the object from the camera image based on the detected end;

an extraction function of extracting a partial image indicating a shape before an indication which is a pointer in a non-selected state and a partial image indicating a shape of the indication which is a pointer in a selected state from partial images; and an information generation function of generating information indicating whether the indicator has the shape before the indication which is the pointer in a non-selected state or the shape of the indication which is the pointer in a selected state.

13. A user interface device configured to specify an indication by identifying a shape of an indicator based on a camera image obtained by capturing the indicator having the shape that changes for the indication, the user interface device comprising:

a detector configured to search an image obtained by binarizing the camera image in at least two different diagonal directions to detect an end of an object included in the camera image;

an image cropping unit configured to crop a partial image from the camera image based on the detected end;

a selector configured to select a partial image indicating a shape before the indication and a partial image indicating a shape of the indication by the indicator when the partial image is a partial image obtained by capturing the indicator as the object; and an information generator configured to generate information indicating whether the indicator has the shape before the indication or the shape of the indication, wherein:

(a) the information generator includes a coordinate storage configured to store coordinates indicating a position of the indicator, and a moving average value calculator configured to read a history of the coordinates stored in the coordinate storage, obtain a moving average value, correct the input coordinates using the moving average value, and output the corrected coordinates in response to input of the coordinates indicating the position of the indicator, and the coordinates indicating the position of the indicator are output from the selector; or (b) the information generator includes a coordinate storage configured to store coordinates indicating a position of the indicator, a coordinate lock controller configured to detect a change in the shape of the indicator and outputs a lock control signal for locking the position of the indicator when the shape changes based on the generated information indicating whether the indicator has the shape before the indication or the shape of the indication, and a coordinate selector configured to output the input coordinates indicating the position of the indicator when the lock control signal is not input, and to read coordinates of the indicator immediately before locking stored in the coordinate storage, maintain the coordinates of the indicator immediately before a shape changes, and output the coordinates of the indicator when the lock control signal is input, and the coordinates indicating the position of the indicator are output from the selector; or (c) wherein the information generator includes a storage configured to store information indicating whether the generated indicator is in a state of the shape before the indication or in a state of the shape of the indication, a continuous state detector configured to read the state of the pointer from the storage, and outputs a switching control signal in the state of the indicator when the state of the indicator changes and the changed state of the indicator is detected a predetermined number of times in succession, a state selector configured to switch a state output before input to a state indicated by input information in response to receiving the switching control signal when information indicating whether the generated indicator is in the state of the shape before the indication or a state of the shape of the indication, and a state indicated by the input information is different from a state output before the input, and a selected state storage configured to store the state output before the input.

14. The user interface device according to claim 13, wherein:

the information generator includes a coordinate storage configured to store coordinates indicating a position of the indicator, and a moving average value calculator configured to read a history of the coordinates stored in the coordinate storage, obtain a moving average value, correct the input coordinates using the moving average value, and output the corrected coordinates in response to input of the coordinates indicating the position of the indicator, and the coordinates indicating the position of the indicator are output from the selector.

15. The user interface device according to claim 13, wherein:

the information generator includes a coordinate storage configured to store coordinates indicating a position of the indicator, a coordinate lock controller configured to detect a change in the shape of the indicator and outputs a lock control signal for locking the position of the indicator when the shape changes based on the generated information indicating whether the indicator has the shape before the indication or the shape of the indication, and a coordinate selector configured to output the input coordinates indicating the position of the indicator when the lock control signal is not input, and to read coordinates of the indicator immediately before locking stored in the coordinate storage, maintain the coordinates of the indicator immediately before a shape changes, and output the coordinates of the indicator when the lock control signal is input, and the coordinates indicating the position of the indicator are output from the selector.

16. The user interface device according to claim 15, comprising a coordinate change amount detector configured to detect a coordinate change amount by reading the coordinates indicating the position of the indicator immediately before locking from the coordinate storage in response to input of the coordinates indicating the position of the indicator, wherein:

in a case of detecting the change in the shape of the indicator, when a change amount from the immediately previous coordinates does not exceed an input predetermined change amount, the coordinate lock controller outputs the lock control signal, and when the change amount exceeds the input predetermined change amount, the coordinate lock controller does not output the lock control signal and outputs a lock release control signal when the change amount from the immediately previous coordinates exceeds the input predetermined change amount after the lock control signal is output, and in a case of receiving the lock release control signal, the coordinate selector releases maintaining of the coordinates of the indicator and outputs the input coordinates indicating the position of the indicator.

17. The user interface device according to claim 15, wherein:

the coordinate lock controller detects a change in the shape of the indicator and outputs a lock release control signal when a predetermined time elapses after the lock control signal is output, and in a case of receiving the lock release control signal, the coordinate selector releases maintaining of the coordinates of the indicator and outputs the input coordinates indicating the position of the indicator.

18. The user interface device according to claim 16, wherein the coordinate lock controller detects a change in the shape of the indicator and rewrites the input predetermined change amount to a value smaller than the predetermined change amount when a predetermined time elapses after the lock control signal is output.

19. The user interface device according to claim 13, wherein:

the information generator includes a storage configured to store information indicating whether the generated indicator is in a state of the shape before the indication or in a state of the shape of the indication, a continuous state detector configured to read the state of the pointer from the storage, and outputs a switching control signal in the state of the indicator when the state of the indicator changes and the changed state of the indicator is detected a predetermined number of times in succession, a state selector configured to switch a state output before input to a state indicated by input information in response to receiving the switching control signal when information indicating whether the generated indicator is in the state of the shape before the indication or a state of the shape of the indication, and a state indicated by the input information is different from a state output before the input, and a selected state storage configured to store the state output before the input.

* * * * *